J. BOYLE.
Awnings.

No. 135,966. Patented Feb. 18, 1873.

Witnesses:
A. W. Almqvist
C. Sedgwick

Inventor:
J. Boyle
PER Munn
Attorneys.

UNITED STATES PATENT OFFICE.

JOHN BOYLE, OF NEW YORK, N. Y.

IMPROVEMENT IN AWNINGS.

Specification forming part of Letters Patent No. 135,966, dated February 18, 1873.

*To all whom it may concern:*

Be it known that I, JOHN BOYLE, of the city, county, and State of New York, have invented a new and useful Improvement in Tension-Rod for Awnings, &c., of which the following is a specification.

Figure 1:
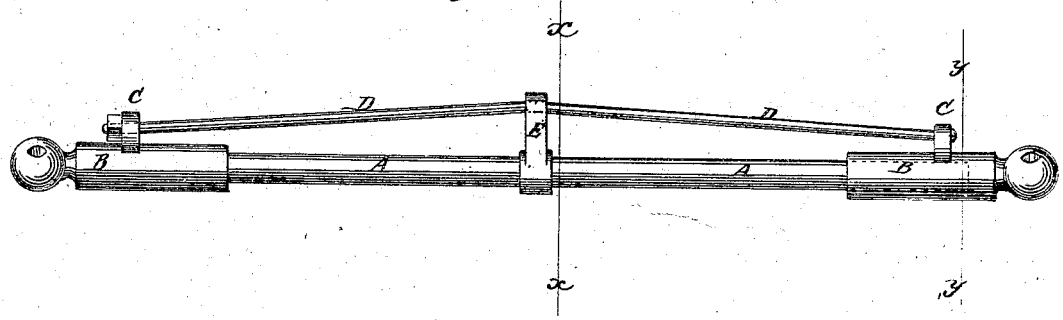
Figure 2:
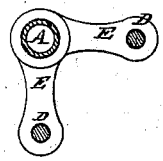
Figure 3:
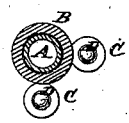

Figure is a top view of my improved extension-rod. Fig. 2 is a detail cross-section of the same taken through the line $x\ x$, Fig. 1. Fig. 3 is a detail cross-section of the same taken through the line $y\ y$, Fig. 1.

Similar letters of reference indicate corresponding parts.

The invention consists in the mode of applying tension-rods to awnings.

A is the main rod, which is made of the desired length, and to the ends of which are attached the sockets or couplings B, to which the brackets are attached. To the sockets B are attached, or upon them are formed, two eyes, C. D are two strengthening or straining-rods, which are passed through the eyes C, and are drawn taut by nuts screwed upon one or both their ends. E are bridges, one or more of which are used, according to the length of the rod A. The bridges E are made with two arms, as shown in Fig. 2, through the outer ends of which are formed holes for the passage of the straining-rods D, as shown in Figs. 1 and 2. The eyes C and bridges E are so arranged that one of the rods D may be below the rod A to resist the downward pressure, and the other upon the inner side of said rod to resist the inward pressure.

Having thus described my invention, I claim as new and desire to secure by Letters Patent—

The application of tension-rods to awnings, substantially in the manner and for the purpose described.

JOHN BOYLE.

Witnesses:
JAMES T. GRAHAM,
T. B. MOSHER,